(12) United States Patent
Yannam et al.

(10) Patent No.: US 11,050,885 B1
(45) Date of Patent: Jun. 29, 2021

(54) CALL INTERCEPTION HEURISTICS

(71) Applicant: Bank of America Corporation, Charlotte, NC (US)

(72) Inventors: Ramakrishna R. Yannam, The Colony, TX (US); Saahithi Chillara, Allen, TX (US); Ravisha Andar, Plano, TX (US)

(73) Assignee: Bank of America Corporation, Charlotte, NC (US)

( * ) Notice: Subject to any disclaimer, the term of this patent is extended or adjusted under 35 U.S.C. 154(b) by 0 days.

(21) Appl. No.: 16/890,110

(22) Filed: Jun. 2, 2020

(51) Int. Cl.
| | |
|---|---|
| *H04M 3/56* | (2006.01) |
| *H04M 7/00* | (2006.01) |
| *H04M 3/51* | (2006.01) |
| *G10L 15/18* | (2013.01) |
| *G06N 5/02* | (2006.01) |
| *G06N 5/04* | (2006.01) |
| *G06F 16/25* | (2019.01) |
| *G06N 20/00* | (2019.01) |
| *G06Q 30/00* | (2012.01) |

(52) U.S. Cl.
CPC ........ *H04M 3/5166* (2013.01); *G06F 16/252* (2019.01); *G06N 5/02* (2013.01); *G06N 5/04* (2013.01); *G06N 20/00* (2019.01); *G06Q 30/016* (2013.01); *G10L 15/1807* (2013.01); *G10L 15/1815* (2013.01); *H04M 3/5183* (2013.01); *H04M 7/0021* (2013.01); *H04M 2201/40* (2013.01); *H04M 2203/558* (2013.01)

(58) Field of Classification Search
CPC ............. H04M 3/5166; H04M 3/5183; H04M 7/0021; H04M 2201/40; H04M 2203/558; G06N 20/00; G06N 5/02; G06F 16/252; G06Q 30/016; G06L 15/1807; G06L 15/1815
USPC ..... 379/88.16, 88.17, 88.18, 265.01, 265.07, 379/265.09, 265.11
See application file for complete search history.

(56) References Cited

U.S. PATENT DOCUMENTS

| | | | |
|---|---|---|---|
| 6,628,763 B1 * | 9/2003 | Mani ..................... | H04Q 3/0016 379/142.08 |
| 10,044,647 B1 * | 8/2018 | Karp ....................... | H04L 51/02 |
| 10,750,019 B1 * | 8/2020 | Petrovykh ........... | G06F 3/04817 |

(Continued)

OTHER PUBLICATIONS

"Emotional Prosody," https://en.wikipedia.org/wiki/Emotional_prosody, Wikimedia Foundation, Inc., Apr. 15, 2020.

(Continued)

*Primary Examiner* — Binh Kien Tieu
(74) *Attorney, Agent, or Firm* — Weiss & Arons LLP; Michael A. Springs, Esq.

(57) ABSTRACT

When a customer initiates an interaction with an interactive voice response ("IVR") system, the customer may need to be transferred to a live agent. Apparatus and methods may formulate timing information for integrating a live agent into an interaction controlled by an artificial intelligence ("AI") engine. The system may integrate machine generated responses into a customer interaction controlled by a live agent. The system may formulate timing information for intercepting the live agent with responses generated by the AI engine. The system may formulate the timing information using interactional analytics and preferences of a specific customer.

18 Claims, 7 Drawing Sheets

(56) References Cited

U.S. PATENT DOCUMENTS

| | | | |
|---|---|---|---|
| 2015/0142704 A1* | 5/2015 | London | G06N 5/022 |
| | | | 706/11 |
| 2019/0158671 A1* | 5/2019 | Feast | G06Q 10/0633 |
| 2020/0177730 A1* | 6/2020 | Dutta | H04M 3/5141 |
| 2020/0327892 A1* | 10/2020 | Fox | G06N 5/003 |
| 2020/0329144 A1* | 10/2020 | Morgan | G06N 3/006 |
| 2020/0365146 A1* | 11/2020 | Adiba | G10L 25/78 |
| 2020/0374394 A1* | 11/2020 | Karp | H04W 4/12 |
| 2021/0006518 A1* | 1/2021 | Karp | H04W 4/24 |

OTHER PUBLICATIONS

"Prosody (linguistics)," https://en.wikipedia.org/wiki/Prosody_(linguistics), Wikimedia Foundation, Inc., Apr. 24, 2020.
Johnstone et al., "The Voice of Emotion: an FMRI Study of Neural Responses to Angry and Happy Vocal Expressions," https://academic.oup.com/scan/article-abstract/1/3/242/2362830, Dec. 1, 2006.

* cited by examiner

CALL INTERCEPTION HEURISTICS

FIELD OF TECHNOLOGY

Aspects of the disclosure relate to technology for improving computer-human interactions.

BACKGROUND

Interactive voice response ("IVR") systems provide automated tools for interacting with callers. A caller may initiate contact with an IVR system and provide inputs to the IVR system. The caller inputs may include voice data, text data and selection of options displayed to the caller. These inputs typically correspond to a caller attempting to express a purpose for contacting the IVR system. The IVR system may use a variety of techniques to discern a meaning of caller inputs and efficiently satisfy the caller's purpose.

An IVR system may be capable of linking a caller to a human agent. For example, an IVR system may not be able to discern the purpose or goal of a caller. In such instances, the IVR system may link the caller to a human agent. In some cases, the caller may request a link to a human agent. In some cases, the IVR system may be configured to determine when to transfer a caller to a human agent.

Typically, after a caller is transferred to the human agent, the human agent exclusively attends to the caller without further automated assistance from the IVR system. In many cases, the IVR system can provide responses to caller inputs faster than the human agent. Transferring a caller to a human agent prematurely may therefore negatively impact caller satisfaction.

It is technically challenging to integrate automated responses from generated by an IVR system into responses formulated by a human agent such that collective involvement by both the human agent and automated tools efficiently satisfy caller's purpose for contacting the IVR system. Likewise, it is technically challenging to integrate responses from human agent into automated responses formulated by IVR system such that collective involvement by both the human agent and automated tools efficiently satisfy the caller's purpose for contacting the IVR system.

Furthermore, it is technically challenging to precisely identify when, during an interactive being handled exclusively by automated tools of the IVR system, it would be efficient to invite a human agent to join the interaction. Likewise, it is also technically challenging to precisely identify when, during an interactive being handled exclusively by the human agent, it would be efficient to integrate automated tools of the IVR system into the interaction.

As described herein, CALL INTERCEPTION HEURISTICS provides technical solutions for efficiently satisfying a caller's purpose for contacting an IVR system by improving collaboration of the automated tools provided by an IVR system and human agents.

BRIEF DESCIPTION OF THE DRAWINGS

The objects and advantages of the disclosure will be apparent upon consideration of the following detailed description, taken in conjunction with the accompanying drawings, in which like reference characters refer to like parts throughout, and in which.

DETAILED DESCRIPTION

Figure 1:
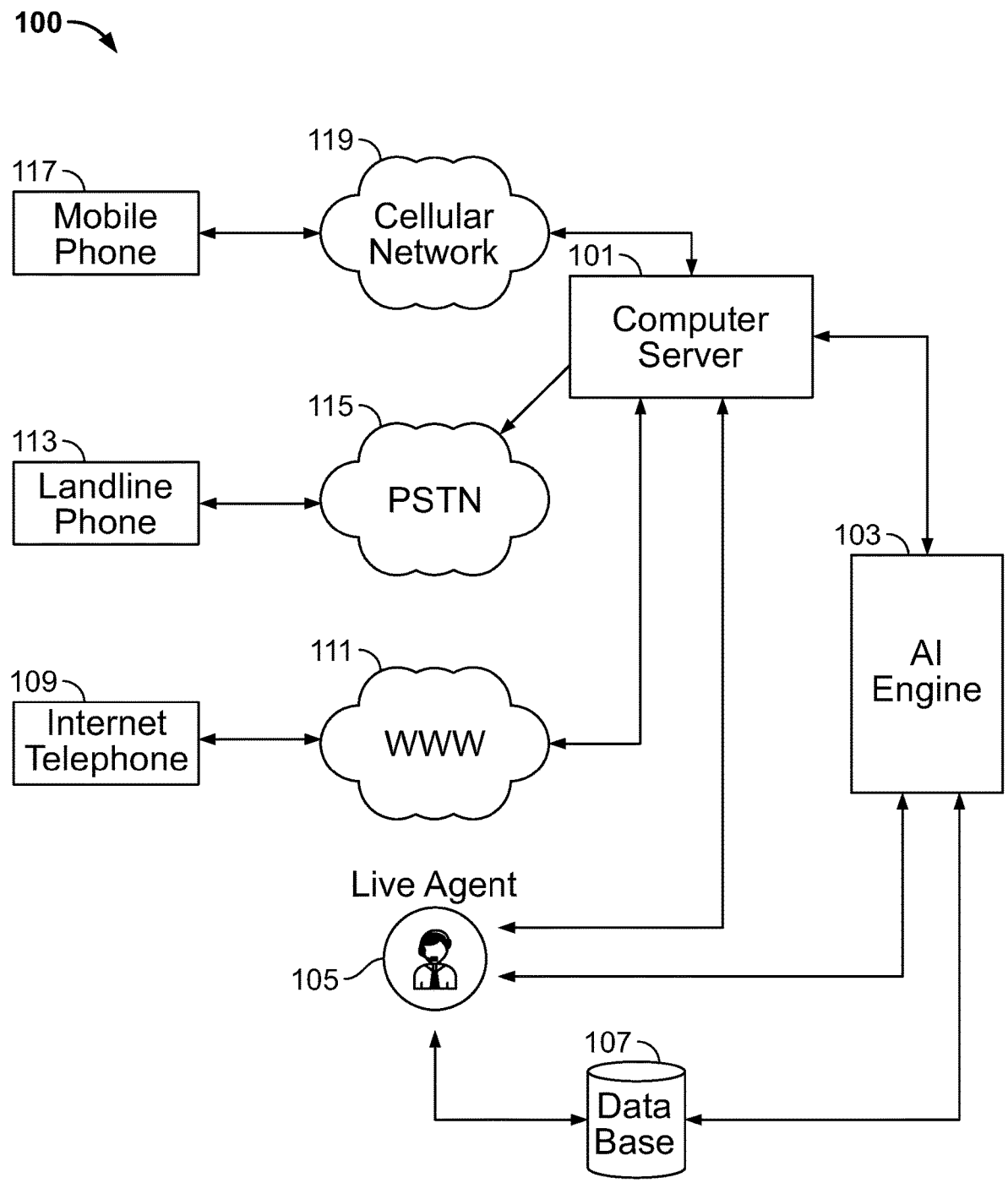
FIG. 1 shows an illustrative system in accordance with principles of the disclosure.

Methods are provided for leveraging artificial intelligence to integrate human and machine responses within an interactive voice response ("IVR") system. Methods may include initiating an interaction with a human caller and an artificial intelligence ("AI") engine. Methods may include capturing voice inputs generated by the human caller. Methods may include providing the voice inputs to the AI engine.

The AI engine may attempt to decipher a question or concern of the human caller. The AI engine may analyze the caller's voice inputs to decipher the question or concern. Methods may include receiving, from the AI engine, a predictive recommendation. The predictive recommendation may include a machine generated determination that the human caller would best be serviced by transferring the caller to a human agent.

The AI engine may initiate a hand-off procedure to the human agent. Methods may include transferring the human caller to the human agent. Methods may include, after transferring the human caller to the human agent, continuing to provide voice inputs generated by the human caller to the AI engine. Even after transferring the caller to the human agent, the AI engine may continue to "listen" to voice inputs generated by the caller. The AI engine may continue to generate predictive recommendations based on analysis of the voice inputs.

Methods may include providing, to the human agent, predictive responses to the caller's voice inputs generated by the AI engine. The predictive responses may include responses to the voice inputs that the human agent may provide to the caller. The predicative responses may include fully formulated responses. Fully formulated responses include machine generated responses that may be forwarded to the human caller by the human agent. Fully formulated responses may be forwarded to the human caller without the human agent making any changes or edits to the machine generate response.

In some embodiments, the human agent may edit a predictive response generated by the AI engine. The human agent may edit the machine generated response so that it addresses a specific question or concern raised by the caller. However, even when after any editing, the machine generated predictive response may reduce a response-time latency of the human agent. For example, providing the predictive response may increase a number of callers that may be concurrently managed by a single human agent.

The AI engine may provide predictive responses to interactions managed by the human agent. The human agent may select a machine generated response and forward it to the caller. By providing the machine generated responses, the AI engine may allow the human agent to manage multiple concurrent interactions. Even though the human agent may edit a predictive response, using the machine generated responses may reduce the amount of time the human agent would have had to spend formulating an original response to the caller.

While monitoring inputs of the caller concurrently with the human agent, the AI engine may generate a plurality of predictive responses. The human agent may determine which AI generated responses are appropriate for the caller. The human agent may accept or reject machine responses generated by the AI engine. The AI engine may be configured to recursively train itself based on whether the human agent accepts or rejects one or more of the machine generated responses.

Methods may include providing, to the AI engine, responses of the human agent to voice inputs of the caller. The responses of the human agent may include voice, text or any suitable response. The AI engine may also be provided with predictive machine generated responses that were rejected by the human agent. The AI engine may also be provided with predictive machine generated responses that were edited by the human agent before being transmitted to a caller. The AI engine may be recursively trained by observing how its machine generated responses are utilized by the human agent.

The recursive training of the AI engine may reduce a frequency of how often the AI engine generates a predictive recommendation to transfer a caller to the human agent. For example, the AI engine may learn from acceptance, rejection or editing of its machine generated responses. The AI engine may learn from the recursive training and attempt to understand why some of its machine generated responses were accepted by the human agent and others were rejected by the human agent. The AI engine may learn from the recursive training and attempt to understand why some machine generated responses were edited by the human agent before transmission to the caller.

Based on the recursive training, the AI engine may improve utilization of its machine generated responses. Improving utilization of machine generated responses may include generating responses that are accepted by the human agent or caller. Such effective human-computer interaction may shorten response times of human agents and improve efficiency of human agents. Other efficiency considerations may include allowing human agents manage multiple interactions concurrently or supervise multiple automated channels concurrently. The ability of the human agent to forward useful machine to a caller may allow the human agent to effectively manage multiple interactions with multiple callers.

The AI engine may be leveraged to provide machine responses in parallel to both the caller and the human agent. For example, even after transferring a caller to the human agent, the AI engine may continue to monitor voice inputs of the caller in parallel with the human agent. The AI engine may independently provide machine generated responses to both the caller and the human agent. The AI engine may generate machine responses that are provided directly to the caller based on a prior response of the human agent to the caller. The AI engine may generate machine responses that are provided directly to the caller while the caller is in communication with the human agent.

The AI engine may learn from responses provided by the human agent to the caller. Based on observing the human agent's responses, the AI engine may anticipate a forthcoming request from the caller. In response to an anticipated request, the AI engine may generate a machine response that provides information to the caller before the caller has even formulated a request. In some embodiments, the AI engine may provide the response to an anticipated request to the human agent.

The AI agent may formulate responses to anticipated requests based on analysis of historical interactions conducted with a caller. Based on learning from the historical interactions, the AI engine may generate machine responses that are specific to linguistic, dialect or semantic style of a caller. A caller or human agent may be more likely to utilize a machine generated response when the response is formulated in way that is familiar or comfortable for the caller or human agent.

The AI engine may also learn from requests submitted by a caller to a human agent. Based on learning from the caller requests, the AI engine may anticipate forthcoming request from the caller. Based on learning from the caller requests, the AI engine may anticipate a forthcoming response from the human agent. The AI agent may formulate such responses based on analysis of historical responses prepared by the human agent. Based on learning from the historical responses, the AI engine may generate machine responses that are specific to the linguistic, semantic style of the human agent. Such custom-tailored responses may be more likely to be utilized by the human agent.

The AI engine may generate a machine response that provides information to a caller before the caller formulates a request for the information. For example, the AI engine may predict what the caller will need based on prior requests of the caller. The AI engine may predict what the caller will need based on a prior response provided to the caller by the human agent.

In some embodiments, the AI engine may provide, to the human agent, a machine generated response to an expected caller request. In some embodiments, the AI engine may provide a machine generated responses to both the caller and the human agent. By providing machine generated responses to both the caller and the human agent during an interaction between the caller and human agent, the AI engine may shorten a duration of the interaction.

Providing machine generated responses to both the caller and the human agent in parallel may facilitate a resolution of the caller's concern faster by focusing the number of possible topics on a limited number of topics. Providing machine generated responses to both the caller and the human agent in parallel may facilitate a resolution of the caller's concern faster by reducing machine presented responses that are rejected by the caller or the human agent.

Even when providing machine generated responses in parallel, the AI engine may provide different machine generated responses to the caller and the human agent. For example, the AI engine may provide a variety of predictive responses to the human agent than to the human caller. The human agent may desire a variety choices so that the human agent can select a desired response and possibly edit the selected response to meet a specific caller need. The AI engine may provide a fewer number of choices to the caller.

By continuing to provide machine generated responses to the human agent even after the caller has been transferred to the human agent, the AI engine may increase a number of concurrent interactions managed by the human agent. The machine responses may allow the human agent to select presented responses and transmit them to callers without having to formulate an original response. Even if a machine generated response requires editing by the human agent to meet a caller need, editing presented responses may be faster than formulating an original response.

Machine generated responses of the AI engine may be improved by recursively training the AI engine. Recursive training may include the AI engine ingesting predictive responses generated by the AI engine and accepted by the human agent. Recursive training may include the AI engine ingesting predictive responses generated by the AI engine and rejected by the human agent. Based on observing which machine generated responses are accepted or rejected by the human agent, the AI engine may better understand how to formulate responses that are more likely to be used and accepted by the human agent.

Based on acceptance or rejections, the AI engine may learn which classes of predictive responses are helpful to the human agent. For example, the AI engine may learn that guiding the human agent to file locations is more helpful that attempting to formulate a complete response. It may be time consuming for the human agent to locate information relevant to a caller's concern. However, the human agent may be able to quickly customize a response to the caller after the AI engine guides the human agent to the relevant information.

For example, the AI engine may dynamically adjust a machine learning model that is applied when operating in parallel with a human agent. The AI engine may determine that one machine learning model is more aligned with the human agent than another machine learning model. The AI engine may adjust the vocabulary or language used when formulating machine responses presented to the human agent.

The AI engine may capture keyboard inputs generated by the human agent. The keyboard inputs may include words or letters typed by the human agent in response to the caller. The AI engine may generate a machine interpretation of the keyboard inputs. For example, the AI engine may determine a semantic meaning of the keyboard inputs. Based on the interpretation, the AI engine may determine a machine generated response that will help the human agent address a concern of the caller.

A machine generated response may include providing to the human agent predictive text, generated by the AI engine, that completes a message of the human agent embodied in the keyboard inputs. For example, the AI engine may detect the following keyboard inputs: "To check your . . . "

Based on the keyboard inputs, the AI engine may determine that a caller has asked how to check an account balance. The AI engine may then display to the human agent tutorial videos explaining how the caller may check their account balance. The human agent may select a desired video and forward to the caller. In some embodiments, based on the keyword inputs of the human agent, the AI engine may display directly to the caller tutorial videos explaining how a caller may check their account balance.

The AI engine may generate videos customized for the caller. For example, the AI engine may generate a video that are curated using the customer's own account as examples. The AI engine may generate videos that are narrated or curated using linguistic, semantic style of the caller. Such details maybe culled from historical interactions conducted with a caller or a detected location of the caller. For example, the AI engine may generate tutorial videos using a currency used in a caller's geographic location.

In some embodiments, the AI engine may attempt to complete keyboard inputs of the human agent. For example, in the above example, the AI engine may present the following choices to the human agent: "To check your [checking] [savings] [investment] balance follow the steps in this [checking tutorial] [savings tutorial] [investment tutorial] video." The text shown in brackets represents choices presented by the AI engine that may be selected by the human agent. The human agent may select the desired options and transmit a customized response to the caller.

In some embodiments, the AI engine may access a database and determine the caller's current balance. The AI engine may display the balance to the human agent. The human agent may then verbally relay the balance to the caller or transmit a message to the caller that includes the current balance. Such human-computer interaction may shorten response time of human agents and improve efficiency of human agents.

In some embodiments, the human agent may hand-off control of an interaction to the AI engine. For example, if the AI engine has accurately determined an intent of the human agent associated with keyboard inputs, the human agent may signal to the AI engine to autonomously interact with the caller. In the example, above, the AI engine may have correctly determined that the human agent was about to explain to the caller how to check their account balances. The AI engine may take over the interaction from the human agent and guide the caller on how to check their account balance. Such human-computer interaction may shorten response time of human agents and improve efficiency of human agents.

The human agent may provide more directed instructions to the AI engine when handing-off control of the interaction to the AI engine. For example, the human agent may signal to the AI engine to interact directly with the caller and determine which account the caller is interested in checking. The AI engine may assume control of the interaction and determine the desired account and explain to the caller how to check the balance of the desired account. Thus, the human agent and the AI engine may work together. The AI engine may be more efficient at some tasks and the human agent more efficient at others. Configuring the AI engine to operate in parallel with the human agent may efficiently provide a caller with satisfactory responses to an inquiry or concern.

Transferring the caller to the human agent may include the AI engine providing the human agent with historical interactions conducted with the human caller. The historical interactions may include those conducted between the caller and the AI engine. The historical interactions may include those conducted between the caller and the human agent. The historical interactions may include those conducted between the caller and the AI engine and human agent operating in parallel.

The historical interaction may provide the human agent insight on a typical concern of the caller or an outstanding caller concern that has not yet been resolved. The insight may allow the human to identify a concern of a caller faster than had the human agent had to interact with the caller to identify the concern. Such human-computer interaction may shorten response time of human agents and improve efficiency of human agents.

The AI engine may generate a predicative indicator for a target historical interaction most relevant to the current interaction. For example, based on inputs provided by the caller, the AI engine may determine a context of a current interaction. The AI engine may review historical interactions and determine whether the caller's current concern is an issue the caller has raised in the historical interactions. The AI engine may locate and display to the human agent target historical interactions associated with the caller's current concern.

The AI engine may highlight to the human agent how the caller's concern raised in the target historical interactions had been resolved. The human agent may utilize solutions highlighted by the AI engine during the current interaction. Such human-computer interaction may shorten response time of human agents and improve efficiency of human agents.

The AI engine may load target interactions into a computer system used by the human agent. The AI engine may load a transaction history associated with the target interaction into a computer system used by the human agent. For example, the AI engine may determine that the caller is now concerned about credit card charges. The AI engine may determine that the caller has previously conducted target historical interactions regarding credit card charges.

The AI engine may locate relevant target historical interactions that include the caller raising concerns regarding credit card charges. The AI engine may locate relevant transactional information that triggered the charges the caller had previously been concerned about. The AI engine may locate recent charges associated with the caller's card account that, based on the historical interactions and transactions, may have triggered the caller's current concern.

The AI engine may display the target historical interactions and associated transactions to the human agent. The display of the target historical interactions and associated transactions may allow the human agent to efficiently understand a context of the caller's current concern, without directly querying the caller. Using the AI engine to provide the human agent with a contextual understanding may allow the human agent to provide detailed and more efficient customer service. Using the AI engine to provide the contextual understanding may allow the human agent to service more callers per unit of time.

The AI engine may apply a first machine learning model. The first machine learning model may be utilized by the AI engine when the AI engine interacts exclusively with the human caller. The AI engine apply a second machine learning model. The second machine learning model may be utilized by the AI engine when the AI engine interacts with the human caller in parallel with a human agent.

For example, the first machine learning model may be configured to allow for the caller to take a lead role in guiding the AI engine to desired information. Using the first machine learning model, the AI engine may provide a single option to the user and will not suggest two or more alternatives. The first machine learning model may be specifically configured to provide the caller easy to understand, clear and straightforward options.

Training of the AI engine may include providing, to the first machine learning model, the predictive responses generated by the AI engine and accepted or rejected by the human agent when the AI engine interacts with the human caller in parallel with the human agent. Although the first machine learning model may not be deployed when the AI engine interacts with the human caller in parallel with the human agent, the first machine learning model may learn from predictive responses generated by the AI engine when operating in-parallel. Responses generated by the AI engine when operating in-parallel may be generated by the second machine learning model.

On the other hand, the second machine learning model, which may be utilized by the AI engine when the AI engine interacts with the human caller in parallel with a human agent, may be more proactive when generating machine responses. For example, the second machine learning model may provide two or more alternatives options to the human agent. The human agent may welcome alternative options. The human agent may be comfortable rejecting generated AI responses. The human agent may be adept at editing generated AI responses.

Training of the AI engine may include providing, to the second machine learning model, predictive responses generated by the AI engine and accepted or rejected by the human caller. The predictive responses generated by the AI engine may be accepted or rejected during exclusive interaction (e.g., no human agent participation) between the AI engine and the human caller. Although the second machine learning model may not be deployed when the AI engine interacts exclusively with the human caller, the second machine learning model may learn from predictive responses generated by the AI engine when operating exclusively with the human caller. Responses generated by the AI engine when interacting exclusively with the human caller may be generated by the first machine learning model.

Based on the accepted or rejected responses, the AI engine may learn which machine generated responses where accepted by the caller or human agent. The AI engine may learn from the accepted or rejected responses how to generate future responses that are more likely to be accepted by the caller or human agent. For example, the AI engine may determine that for a given caller or human agent, suggested sentence completions will usually be rejected. During a subsequent interaction with the caller or human agent, the AI engine may take a more passive role and wait to generate responses until goals or intent of caller or human agent are clear or more definitive.

An interactive voice response ("IVR") system is provided. The system may include a telephony server. The telephony server may be a computer server. The server may be a network connected computer system. Computer servers, as disclosed herein, may include a processor circuit. The processor circuit may control overall operation of the server and its associated components. The processor circuit may include hardware, such as one or more integrated circuits that form a chipset. The hardware may include digital or analog logic circuitry configured to perform any suitable (e.g., logical) operation.

For example, a server may include one or more of the following hardware components: I/O circuitry, which may include a transmitter device and a receiver device and may interface with fiber optic cable, coaxial cable, telephone lines, wireless devices, physical network layer hardware, a keypad/display control device or any other suitable encoded media or devices; peripheral devices, which may include counter timers, real-time timers, power-on reset generators or any other suitable peripheral devices; a logical processing device, which may compute data structural information, structural parameters of the data, or quantify indices; and machine-readable memory.

Machine-readable memory may be configured to store, in machine-readable data structures: machine learning algorithms, AI algorithms, or any other suitable information or data structures. Components of the server may be linked by a system bus, wirelessly or by other suitable interconnections. System components may be present on one or more circuit boards. In some embodiments, the components may be integrated into a single chip. The chip may be silicon-based.

The server may include RAM, ROM, an input/output ("I/O") module and a non-transitory or non-volatile memory. The I/O module may include a microphone, button and/or touch screen which may accept user-provided input. The I/O module may include one or more of a speaker for providing audio output and a video display for providing textual, audiovisual and/or graphical output.

Software applications may be stored within the non-transitory memory and/or other storage medium. Software applications may provide instructions to the processor that enable the server to perform various functions. For example, the non-transitory memory may store software applications such as an operating system, application programs, and an associated database. Some or all of computer executable instructions of the server may be embodied in hardware or firmware components of the server.

The server may include cloud computing and virtualization implementations of software. Such implementations may be designed to run on a physical server supplied externally by a hosting provider, a client, or other virtualized platform.

Software application programs, which may be used by the server, may include computer executable instructions for invoking user functionality related to communication, such as email, short message service ("SMS"), and voice input and speech recognition applications. Software application programs may utilize one or more algorithms that formulate predictive machine responses, formulate database queries, process human caller inputs, process human agent inputs, or any other suitable tasks.

A server may include a communication circuit. The communication circuit may include a network interface card or adapter. When used in a WAN networking environment, apparatus may include a modem, antenna or other circuitry for establishing communications over a WAN, such as the Internet. The communication circuit may include a modem and/or antenna. The existence of any of various well-known protocols such as TCP/IP, Ethernet, FTP, HTTP and the like is presumed, and the server may be operated in a client-server configuration to permit retrieval of web pages from a web-based server. Web browsers can be used to display and manipulate data on web pages.

A server may include various other components, such as a display, battery, speaker, and antennas. Network connected systems may be portable devices such as a laptop, tablet, smartphone, other "smart" devices (e.g., watches, eyeglasses, clothing having embedded electronic circuitry) or any other suitable device for receiving, storing, transmitting and/or displaying electronic information.

A server may include, and may be operational with, numerous other general purpose or special purpose computing system environments or configurations. Examples of well-known computing systems, environments, and/or configurations that may be suitable for use with this disclosure include, but are not limited to, personal computers, server computers, handheld or laptop devices, tablets, "smart" devices (e.g., watches, eyeglasses, clothing having embedded electronic circuitry) mobile phones, multiprocessor systems, minicomputer systems, microprocessor systems, mainframe computers, distributed computing environments that include any of the above systems or devices, and the like.

A server may utilize computer-executable instructions, such as program modules, executed by a processor. Generally, program modules include routines, programs, objects, components, data structures, etc. that perform particular tasks or implement abstract data types. A server may be operational with distributed computing environments where tasks are performed by remote processing devices that are linked through a communications network. In a distributed computing environment, program modules may be located in both local and remote computer storage media including memory storage devices. A server may rely on a network of remote servers hosted on the Internet to store, manage, and process data (e.g., "cloud computing" and/or "fog computing").

Servers disclosed herein may be produced by different manufacturers. For example, the caller may connect to the IVR system via a first server, and the AI engine may be run on a second server. A human agent may utilize a third server. Servers may capture data in different formats. Servers may use different data structures to store captured data. Servers may utilize different communication protocols to transmit captured data or communicate with other systems. Despite such operational differences, servers may be configured to operate substantially seamlessly to interact with the caller, human agent and the AI engine across different systems operating systems, hardware or networks.

The IVR system may include a telephony server. The telephony server, in operation, may receive inputs submitted by a caller using a communication network. The inputs submitted by the caller may include voice inputs. The inputs submitted by the caller may include text or touch inputs. The telephony server may provide an interface for the caller to interact with an AI engine over the communication network. The telephony server may transmit to the caller, over the communication network, responses to the inputs. The responses may be generated by the AI engine.

The IVR system may include an application server. The application server may host the AI engine. The application server may provide computer resources (hardware and software) for the implementing the AI engine. The application server may provide access to network connections for the AI engine to interact with callers and human agents.

The application server, in operation, may receive a first set of inputs generated by the caller. The application server may receive the first set of inputs from the telephony server. The first set of inputs may be voice inputs submitted by the caller.

The AI engine running on the application server may generate a machine interpretation of the first set of inputs received from the caller. The machine interpretation may identify the caller. The machine interpretation may identify a purpose, question or concern of the caller. Based on the machine interpretation, the AI engine may classify the first set of inputs as requiring intervention by a human agent.

Based on the classification, the AI engine may link a computer terminal accessible by the human agent to the application server. The computer terminal may be a computer server. After linking the terminal to the application server, the AI engine may receive, from the telephony server, a second set of inputs generated by the caller. The second set of inputs may include inputs submitted by the caller to the human agent. The AI engine may generate a machine interpretation of the second set of inputs.

The AI engine may monitor responses provided by a human agent to the caller. The AI engine may intercept the human agent's responses to the second set of inputs provided by the caller. The intercepting may include the AI engine displaying a machine generated response on the linked terminal of the human agent. The machine generated response may be formulated based a machine interpretation of the second set of inputs submitted by the caller.

The intercepting by the AI engine may reduce a duration of time the terminal is linked to the application server. When the AI engine provides machine generated responses to the human agent's linked terminal, the human agent may utilize those machine generated responses to efficiently resolve a concern of the caller. The intercepting by the AI engine may therefore shorten a duration of time the terminal is linked to the application server relative to time the terminal would have been linked to the application server without the intercepting by the AI engine.

Methods may include the AI engine determining when to intercept an interaction managed by a human agent. Intercepting the human agent may include the AI engine providing a machine generated response directly to the human agent based on caller inputs. Intercepting the human agent may include the AI engine providing a machine generated response directly to the caller.

Methods may include improving interception timing of the AI engine by recursively providing the AI engine with intercepted responses generated by the AI engine and accepted or rejected by the human agent. Methods may include improving interception timing of the AI engine by recursively providing the AI engine with intercepted responses generated by the AI engine and accepted or rejected by the caller. The AI engine itself may recursively monitor intercepted responses generated and accepted or rejected by the human agent and/or caller.

Methods may include improving interception timing of the AI engine by recursively providing to the AI engine responses formulated by the human agent. Methods may include improving interception timing of the AI engine by recursively providing to the AI engine responses formulated by the human agent when intercepted machine generated responses are rejected by the caller. Improving interception timing of the AI engine may reduce a frequency of how often the AI engine generates a predictive recommendation to transfer the human caller to the human agent. By learning from interactions between the human agent and the caller, the AI engine may further improve its ability to efficiently discern a caller's purpose or address the caller's purpose.

The AI engine may determine when to intercept a human agent with a proposed machine generated response. Intercepting the human agent may include initiating a direct machine interaction with a caller in communication with the human agent. Intercepting the human agent may include presenting machine generated responses to the human agent. Intercepting the human agent may include presenting machine generated responses to the human agent and, in a parallel, initiating direct machine interaction with the caller.

The AI engine may determine when to intercept the human agent based on extracting prosody information from voice inputs. Prosody information may include non-semantic aspects of speech. For example, prosody information extracted by the AI engine may include changes in pitch, loudness, timbre, speech rate, and pauses. The AI engine may extract prosody information from voice inputs of the human agent, the caller or both.

The AI engine may determine when to intercept the human agent based on extracting semantic information from voice inputs. Semantic information may include logical aspects of meaning, such as sense, reference, implication, veracity, and logical form of speech. Sematic information may include word meanings and relationships between words.

Voice inputs provided to the AI engine may be voice inputs of a caller, a human agent or both. For example, the AI engine may determine when to intercept a human agent based on extracting prosody information from responses provided by the human agent to the caller. The AI engine may determine when to intercept the human agent based on extracting semantic information from responses provided by the human agent to the caller. The AI engine may intercept the human agent to provide time the human agent to regain composure, transfer the caller to a supervisor or determine how to satisfy the caller's purpose.

A human agent may manage a plurality of concurrent interactions with multiple callers. The AI engine may monitor voice inputs associated with the plurality of concurrent interactions managed by a human agent. The AI engine may monitor voice inputs associated with the plurality of concurrent interactions managed by multiple human agents.

The AI engine may determine when to intercept the human agent based on collective prosody and/or semantic information generated by the human agent across the plurality of concurrent interactions. For example, if the pitch of all the callers exceeds a pre-defined limit, the AI engine may intercept the human agent. The AI engine may determine when to intercept the human agent based on collective prosody and/or semantic information generated by one or more of the multiple callers interacting with the human agent.

The AI engine may determine when to intercept the human agent with respect to a target caller based on prosody and/or semantic information generated by the interaction between the human agent and the target caller. In some embodiments, the AI engine may determine when to intercept the human agent with respect to a target caller based on prosody and/or semantic information generated by the interaction between the human agent and a different caller. The AI engine may learn from an interaction between a first caller and the human agent how to satisfy a purpose of a second caller.

Intercepting the human agent may include initiating a video chat between the human agent and the human caller. A video chat may allow the caller and human agent to hear and see each other, thereby increasing rapport between the human agent and caller. Increasing rapport may increase caller satisfaction and Intercepting the human agent may include transferring a voice-based interaction to a text-based interactive channel. A text-based channel may mute prosody and sematic elements of voice inputs that may be inhibiting the human agent from satisfying the caller's purpose. Machine generated muting of those prosody and sematic elements may increase efficiency of an IVR system and increase caller satisfaction.

The AI engine may detect prosody and sematic information by monitoring characteristics of voice inputs. Such characteristics may include pitch of sounds (e.g., measured in hertz), duration of sounds (in milliseconds), intensity or loudness (e.g., measured in decibels) and timbre (e.g., measured by energy distribution within a frequency range). The AI engine may intercept the human agent in response to detecting prosody and sematic elements of voice inputs that may inhibit the human agent from satisfying the caller's purpose. Such prosody and semantic elements may be detected based the measured voice input characteristics.

For example, when the AI engine detects a voice input characteristic or combination of characteristics that indicates stress (of the caller, human agent or both), the AI engine may intercept the human agent. When the AI engine detects that a voice input characteristic or combination of characteristics are nearing levels associated with an indication of stress, the AI engine may intercept the human agent. Intercepting the human agent before input characteristics indicate stress may prevent the interaction from triggering a stress indicator. Illustrative characteristics that may indicate stress include detecting voice inputs having longer length, increased loudness, and differences in timbre.

The IVR system may include at least one database. The database may store transaction information associated with the caller. The database may be run on one or more computer servers. The database may run an application program interface ("API") that is compatible with the AI engine. The API may provide the AI engine access to the information stored on the database. The information stored on the database may include real-time and/or historical transaction information.

Machine interpretations of caller inputs may be generated by the AI engine based on the transaction information extracted from the database. The AI engine may extract and analyze transaction information before providing a machine generated response to the caller or human agent. The AI engine may determine when to intercept the human agent based on the transaction information. AI engine may determine when to intercept the human agent based on a combination of input characteristics and transaction information.

For example, in conjunction with transaction information extracted from the database, the AI engine may determine that detected prosody and sematic elements of voice inputs are likely to inhibit the human agent from satisfying the caller's purpose or concern. The extracted transaction information may indicate that caller is associated with an erratic spending pattern or other atypical transactions. Such atypical transactions may be detected based on analysis of the caller's historical transaction information. Such atypical transactions may be detected based on comparing the caller's transaction history to other transaction information stored in the database.

As a further example, the AI engine may determine to proactively link the terminal to the application server transfer based on transaction information extracted from the database. Linking the terminal to the application server may correspond to transferring a caller to a human agent. The transaction information may indicate that the caller is associated with a special status within an organization or has been a longstanding customer. To provide service commensurate with the caller's special status, when the caller initiates an interaction with the IVR system, the AI engine may transfer the caller to a human agent before attempting to ascertain the caller's purpose. In other embodiments, if the AI engine cannot ascertain the caller's purpose after one or two attempts, the AI engine may transfer the caller to the human agent. One or two attempts may be less than the typical number of attempts made by the AI engine for callers not associated with a special status.

The AI engine may detect a rejection or acceptance by the human agent of the machine interpretation of the second set of caller inputs (inputs captured after the caller has been transferred to the human agent). The rejections or acceptance may be recursively provided to the AI engine. The rejections or acceptances may be provided to the AI engine and recursively train the AI engine. The AI engine may learn from the rejections or acceptances how to generate responses that are more likely to be accepted by the caller or human agent. The AI engine may learn from the rejections or acceptances when to trigger a linking of the terminal to the application server.

Recursively training the AI engine may reduce how often the AI engine links the terminal to the application server relative to how often the AI engine links the terminal to the application server without the recursive training. Fewer instances of linking the terminal to the application server may correspond to the AI engine successfully resolving concerns of a caller without requiring human agent intervention.

The AI engine may construct a profile of a caller. The AI engine may construct a profile of a human agent. The AI engine may dynamically construct a profile for a caller after the caller initiates an interaction with the IVR system. The AI engine may dynamically construct a profile for a human agent after a terminal is linked to the application server.

The AI engine may construct a profile based on transaction information stored in the database. A profile may be constructed based on the transaction information stored in the database and prosody/semantic analysis of voice inputs received from a caller or human agent. The profile may be constructed based on prior interactions of the AI engine and the caller. The profile may be constructed based on prior interactions of the AI engine with human agent. Records of the prior interactions may be stored in the database.

The AI engine may construct the profile based on prosody or semantic analysis of prior interaction between a caller and the IVR system. The profile may indicate a level of engagement of the caller with an entity that provides the IVR system. The profile may indicate a status level of the caller within the entity that provides the IVR system. The AI engine may determine when to link the terminal to the application server based on the profile. The AI engine may determine when to intercept a human agent based on the constructed profile.

The AI engine may generate a machine response to voice inputs captured from a caller by interacting with the caller using a persona the AI engine determines is most likely to address, within a target interval, a purpose of the caller having the constructed profile. A persona generated by the AI engine may include a communication channel utilized by the AI engine for interacting with the caller.

For example, the application server may include a text communication channel, a voice communication channel and a video communication channel. The AI engine may be configured to construct a persona configured to interact with a caller or human agent using a combination of text, voice and video communications channels. The AI engine may construct a persona that is expected build and establish rapport when interacting with a caller or human agent. The AI engine may determine that the human agent or caller is likely to accept machine generated responses provided by the AI engine when the AI engine uses the constructed persona.

The AI engine may construct a persona by selecting a voice, accent or language for communicating with the caller or human agent. For example, the AI engine may attempt to build rapport by communicating with a caller using a foreign language, accent or specific prosody or semantic characteristics. The AI engine may construct a persona that uses an accent associated with a locale of the caller or human agent.

The AI engine may construct a persona before conducting any interaction with the caller or human agent. For example, the AI engine may construct the persona based on a phone number of the caller or known location of the human agent. The AI engine, in operation, may dynamically adjust the persona. For example, the AI engine may adjust the persona in response to ongoing analysis of voice inputs received from a caller or human agent. The AI engine may adjust a persona based on a duration of time a caller is connected to the IVR system.

The AI engine may receive a problem set from a terminal of the human agent. The problem set may include a description of a purpose of a caller for initiating an interaction with the IVR system. The problem set may be determined by the human agent. In some embodiments, the AI engine may itself generate a problem-set based on its interaction with a caller. An illustrative problem-set may include queries such as "What did I buy at merchant xyz in April?", "What is my interest rate?" or "How do I open a new account?".

The AI engine may construct a custom persona for solving the identified problem. After receiving or formulating the problem set, the AI engine may receive voice inputs generated by the caller. The AI engine may apply the persona to generate a machine interpretation of the voice inputs and a machine generated response to the problem set.

The AI engine may construct a first persona for interacting with a caller. The AI engine may determine that the second persona is likely build rapport with caller. The AI engine may determine that the caller is likely to accept machine generated responses provided by the AI engine using the first persona. The AI engine may determine that the second persona will mimic a response to the caller formulated by the human agent.

The AI engine may construct a second persona for interacting with a human agent. The AI engine may determine that the second persona is likely build rapport with the human agent. The AI engine may determine that the human agent is likely to accept machine generated responses provided by the AI engine using the second persona.

The AI engine may generate the second persona based on a number of callers simultaneously linked to a terminal of the human agent. For example, when the number of callers linked to the terminal is above a threshold number, the AI engine may construct a second persona that utilizes a text-based communication channel. When the human agent is managing multiple callers, the human agent may not have time to listen or understand voice instructions or responses.

As a further example, when the number of callers linked to the terminal is above a threshold number, the AI engine may construct a second persona that provides the human agent with background information that may be useful when responding to one or more of the callers. When the human agent is managing multiple callers, the human agent may not have time to listen or understand voice instructions or responses. However, providing background information on a specific caller may help the human agent when formulating a response to that caller.

The AI engine may intercept the human agent by providing predictive text to the terminal of the human agent. The predictive text may be generated by the AI engine. The predicative text may complete keyboard inputs entered by the human agent in response to the caller's second set of inputs. By completing the keyboard inputs, the AI engine may allow the human agent to efficiently respond to the caller.

The predictive text may be completed using the second persona. For example, the second persona may provide the predictive text using language, syntax or semantics determined based on analysis of historical responses formulated by the human agent. The second persona may attempt to mimic language, syntax or semantics typically used by the human agent. The AI engine may determine that such a persona is likely build rapport with the human agent and increase an acceptance rate of machine generated responses provide to the human agent by the AI engine.

The AI engine may generate a machine interpretation of the second set of caller inputs based on a machine interpretation of the first set of voice inputs. The AI engine may account for its own prior machine generated responses when interacting exclusively with the caller or when generating a machine generated response that will intercept the human agent.

Similarly, the AI engine may generate a machine interpretation of a second set of inputs (submitted by the caller to a human agent) based on responses to those inputs provided by the human agent. The AI engine may also generate a machine interpretation of the second set of inputs based on responses to a first set of inputs previously provided by the human agent. When generating a response that will intercept the human agent, the AI engine may account for the human agent's prior responses transmitted to callers.

The AI engine may detect whether the human agent agrees with a decision, by the AI engine, to transfer the caller to a human agent. For example, after receiving a caller transferred by the AI engine, the human agent may transfer the caller back to the AI engine. The human agent may provide the AI engine with information directing the AI engine to perform a specific task or solve a problem set, in order to resolve a concern of the caller. For example, the human agent may direct the AI engine to interact exclusively with the caller and close an account or open a new account.

When a caller is transferred back to the AI engine, the AI engine may analyze the first set of inputs originally received from the caller and determine whether the problem set now provided by the human agent could have been gleaned from caller inputs it interpreted. The human agent may provide an indication of whether the caller should have been transferred to the human agent. The human agent may indicate to the AI engine that the caller's concern was in fact more efficiently resolved by transferring the caller to the human agent. The AI engine may be trained based on indications provided by the human agent.

Such indicators provided by the human agent may not be explicit. For example, the AI engine may interpret that the human agent disagrees with the transfer based on actions taken by the human agent. For example, a transfer of the caller back to the AI engine without the human agent providing any response to the caller may indicate the human agent disagrees with the AI engine's transfer decision.

An interactive voice response ("IVR") system is provided. The system may include a telephony server. The telephony server, in operation, receives inputs submitted by a caller using a communication network. The inputs submitted by the caller may include voice inputs, text, touch or any suitable inputs.

The telephony server may provide an interface for the caller to interact with an AI engine over the communication network. The telephony server may transmit to the caller, over the communication network, responses generated by the AI engine.

The IVR system may include an application server. The application server may host the AI engine. The application server, in operation, receives, from the telephony server, a first set of inputs generated by the caller. The application server generates a machine interpretation of the first set of inputs. Based on the machine interpretation, the application server classifies the first set of inputs as raising a concern or problem set that requires intervention by a human agent.

Based on the classification, the application server links a terminal accessible by the human agent to the application server. The linking of the terminal and the application server establishes a communication path linking the human agent and the AI engine. After linking the terminal to the application server, the application server receives, from the telephony server, a second set of inputs generated by the caller. The second set of inputs are generated by the caller when interacting with the human agent.

The application server may generate a first set of machine responses to the second set of inputs. The first set of machine responses may be formulated for the caller. The application server also generates a second set of machine response to the second set of inputs. The second set of machine responses may be formulated for the human agent. In parallel, the application server provides the first set of machine responses to the caller and provides the second set of machine responses to the human agent.

By formulating machine responses based on input from both the caller and human agent and providing the machine responses generated based on those inputs in parallel to the human agent and caller, the application server increases the accuracy and relevance of the its machine generated responses. More accurate and relevant machine generated responses allow the caller to efficiently achieve their purpose or goal without assistance from the human agent. More accurate and relevant machine generated responses allow the human agent to efficiently address a caller's concerns. More accurate and relevant machine generated responses allow the human agent to efficiently address multiple callers concurrently. Thus, the providing, by the AI engine, of the first and second sets of machine responses in parallel reduces a duration of an interaction between the caller and the human agent relative a duration of interactions without the application server providing the responses in parallel.

The application server may apply a first machine learning model when the AI engine interacts exclusively with the caller. The application server may apply a second machine learning model when the AI engine interacts with the caller and the human agent.

Two or more callers may be concurrently linked to the terminal of a human agent. For example, the human agent may service two or more callers. The application server may apply a third machine learning model when the AI engine provides machine generated responses based on inputs received from two or more callers concurrently linked to a terminal.

When the human agent is servicing two or more callers, the AI engine may adapt its machine generated responses based on a workload of the human agent. For example, when the human agent is servicing a single caller, the AI engine may generate detailed responses. The detailed responses may be edited or otherwise customized by the human agent before transmission to the caller (e.g., via the telephony server). However, when the human agent is concurrently servicing two or more callers, the human agent may not have time to edit or customize machine responses generated by the AI engine. In such scenarios, the AI engine may formulate general or background information regarding the callers or their concerns that may be useful to the human agent.

For example, based on a detected context of an interaction, the AI engine may load recent transactions associated with the caller. The AI engine may generate and provide a caller profile to the human agent. A profile may include an assessment of prior interactions with the caller. The profile may be generated based on interactions conducted with a specific human agent. A profile may include a current financial snapshot of the caller. The profile may include final responses that have successfully resolved prior interactions with the caller. The profile may include suggested responses formulated by the AI engine to resolve the caller's current concerns.

Apparatus and methods in accordance with this disclosure will now be described in connection with the figures, which form a part hereof. The figures show illustrative features of apparatus and method steps in accordance with the principles of this disclosure. It is to be understood that other embodiments may be utilized, and that structural, functional and procedural modifications may be made without departing from the scope and spirit of the present disclosure.

The steps of methods may be performed in an order other than the order shown and/or described herein. Method embodiments may omit steps shown and/or described in connection with illustrative methods. Method embodiments may include steps that are neither shown nor described in connection with illustrative methods. Illustrative method steps may be combined. For example, an illustrative method may include steps shown in connection with any other illustrative method.

Apparatus may omit features shown and/or described in connection with illustrative apparatus. Apparatus embodiments may include features that are neither shown nor described in connection with illustrative apparatus. Features of illustrative apparatus may be combined. For example, an illustrative apparatus embodiment may include features shown or described in connection with any other illustrative apparatus and/or method embodiment.

FIG. 1 shows illustrative system 100. System 100 includes computer server 101. Computer server 101 may be a telephony server. Computer server 101 may receive inputs submitted by a caller using mobile phone 117 and cellular communication network 119. Computer server 101 may receive inputs submitted by a caller using landline phone 113 and public switched telephone network ("PSTN") 115. Computer server 101 may receive inputs submitted by a caller using internet phone 109 using internet 111.

Computer server 101 may be configured to receive inputs concurrently from multiple callers using different devices and communication networks. Computer server 101 may provide an interface for callers to access AI engine 103 using any of communication networks 111, 115 or 119. In response to the received inputs, computer server 101 may transmit to a caller (e.g., using devices 109, 113 or 117) responses generated by AI engine 103. AI engine 103 may be hosted on an application server.

Based on inputs received from devices 109, 113 or 117 via computer server 101, AI engine 103 generates a machine interpretation of the inputs. AI engine 103 may determine, based on the inputs, whether one or more of callers using devices 109, 113 or 117 require intervention by human agent 105. AI engine may link devices 109, 113 or 117 to a terminal of human agent 105.

After linking one or of devices 109, 113 or 117 to human agent 105, AI engine 103 receives, from computer server 101 additional inputs generated by callers using devices 109, 113 or 117. AI engine 103 generates a first set of machine responses based on the additional inputs. AI engine 103 may provide the first set of machine responses to devices 109, 113 or 117 via computer server 101.

The first set of machine responses may be specially generated by AI engine 103 for callers using devices 109, 113 or 117. For example, AI engine 103 may customize the first set of machine generated responses for viewing or listening on a specific device 109, 113 or 117. The customization may include formatting the response for viewing on specific size screen or enabling interactive features based on device capability.

AI engine 103 may access transaction information stored on database 107. Based on transaction information stored on database 107, AI engine 103 may customize the first set of machine generated responses. For example, transaction information stored in database 107 may allow AI engine 103 to determine a purpose of why a caller using devices 109, 113 or 117 may have initiated an interaction with telephony server 101. For example, AI engine 103 may detect a recent or an anomalous transaction within database 107 that is linked to the caller using devices 109, 113 or 117. AI engine 103 may determine that the recent or an anomalous transaction is a likely purpose or concern for contacting telephony server 101.

AI engine 103 may use transaction information stored in database 107 to provide machine generated responses that include relevant and customized data to devices 109, 113 or 117. For example, AI engine 103 may generate text or provide instructions to a caller explaining how, using one of devices 109, 113 or 117, the caller may cure an anomalous transaction.

AI engine 103 may also generate a second set machine responses to additional inputs received after a caller has been transferred to human agent 105. The second set of machine generated responses may be provided to human agent 105. AI engine 103 may use transaction information stored on database 107 to generate machine responses that include relevant and customized data extracted from database 107. For example, AI engine 103 may provide human agent 105 a transcript of a prior interaction with the caller or flag transactions determined to be relevant to a caller's current concerns, as determined based on the additional inputs. Relevant transcripts and transactions may be located based on an identity of a caller or prior communication/interaction of components 101, 103, 105 or 106 with devices 109, 113 or 117.

AI engine 103 may provide, in parallel, a first set of machine responses to one or more of devices 109, 113 or 117 and a second set of machine responses to the human agent 105. Providing the first and second sets of machine responses in parallel reduces a duration of caller interaction with components 101, 103, 105 or 106 relative a duration of an interaction when AI engine 103 does not provide the first and second set of responses in parallel.

Figure 2:
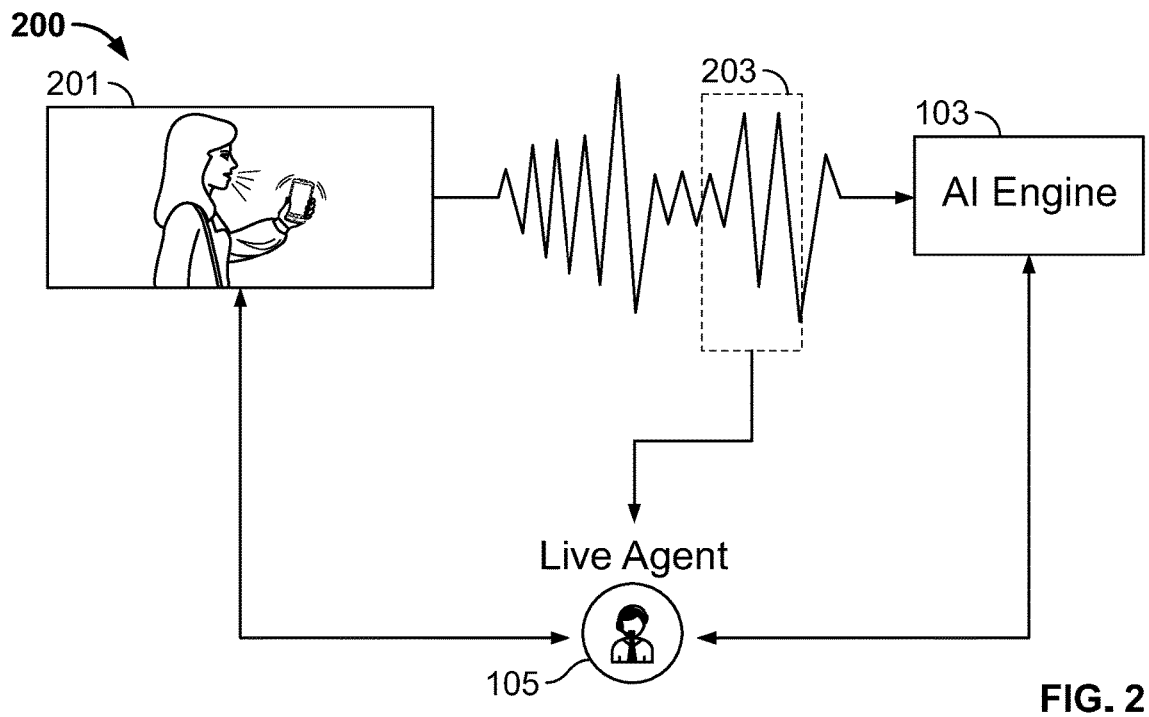
FIG. 2 shows an illustrative system in accordance with principles of the disclosure.

FIG. 2 shows illustrative scenario 200. Scenario 200 shows caller 201 using a device (such as devices 109, 113 or 117 shown in FIG. 1) to access AI engine 103. Scenario 200 shows that AI engine 103 may analyze voice input provided by caller 201.

Scenario 200 shows that AI engine has flagged segment 203 of the voice inputs. Scenario 200 shows that based on segment 203, AI engine 103 transfers caller 201 to human agent 105. Analysis of segment 203 may indicate that caller 201 would best be serviced by human agent 105. For example, AI engine may determine that segment 203 indicates caller 201 is unhappy with machine generated responses provided by AI engine 103. Prosody or semantic analysis of segment 203 may trigger AI engine 103 to initiate the transfer to human agent 105.

Figure 3:
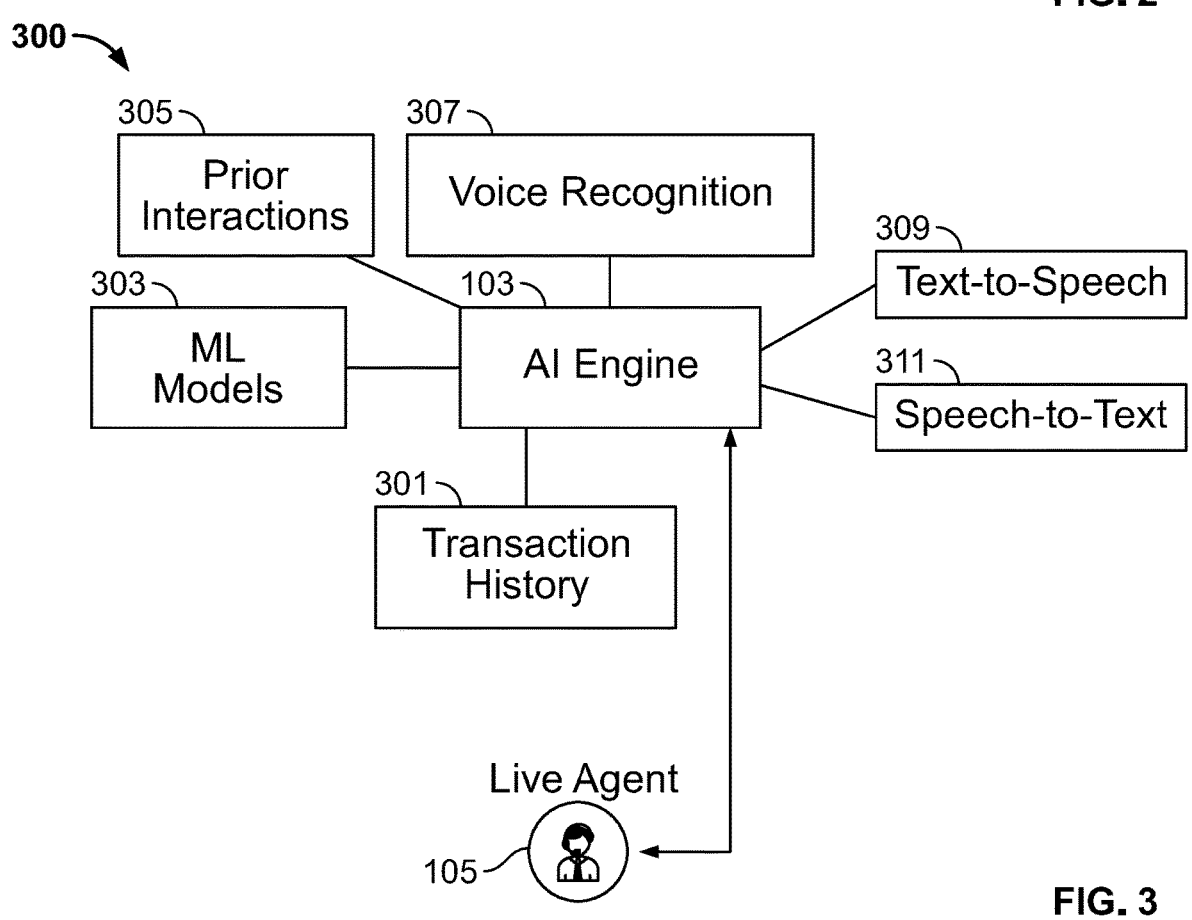
FIG. 3 shows an illustrative scenario and apparatus in accordance with principles of the disclosure.

FIG. 3 shows illustrative system 300. System 300 shows illustrative inputs that may be utilized by AI engine 103 to construct a persona for interacting with caller 201 or human agent 105.

AI engine 103 may utilize transaction history 301. Transaction history 301 may provide background information regarding caller 201. Transaction history 301 may provide insights into a purpose or goal of caller 201 when interacting with system 100. Transaction history 301 may provide insights into how to interact with caller 201. For example, transaction history 301 may indicate that caller 201 has been assigned a special status within an organization.

AI engine 103 may utilize different machine learning models 303. AI engine 103 may utilize a first machine learning model when interacting with caller 201. AI engine 103 may utilize a second machine learning model when interacting with human agent 105. AI engine 103 may utilize a third machine learning model when interacting in parallel with caller 201 and human agent 105. AI engine may utilize one or more machine learning models when formulating profiles or personas.

AI engine 103 may utilize records of prior interactions 305. Prior interactions 305 may include records of responses and voice inputs associated with prior interaction between caller 201 and system 100. Prior interactions 305 may include records of responses and voice inputs associated with prior interaction between caller 201 and human agent 105.

Prior interactions 305 may provide AI engine 103 insight into how to build rapport with caller 201 or human agent 105. Prior interactions 305 may include machine generated responses that were accepted by caller 201 or human agent 105. Prior interactions 305 may include machine generated responses that were rejected by caller 201 or human agent 105. During a current interaction, AI engine 103 may construct a persona for communicating with caller 201 or human agent 105 based on prior interactions 305.

AI engine 103 may utilize voice recognition module 307. Voice recognition module 307 may translate voice inputs into commands or text understandable by AI engine 103. For example, voice recognition module 307 may translate voice inputs into service requests or problem sets. Voice recognition 307 may identify prosody and semantic information within voice inputs.

AI engine 103 may utilize text-to-speech module 309. Text-to-speech module 309 may convert text formulated by human agent 105 into spoken instructions provided to caller 201. Text-to-speech module 309 may convert text formulated by caller 201 into spoken instructions provided to human agent 105.

When interacting with caller 201, AI engine 103 may apply a constructed persona to formulate speech having prosody and semantic information that is expected to build rapport with caller 201. When interacting with human agent 105, AI engine 103 may apply a constructed persona to formulate speech having prosody and semantic information that is expected to build rapport with human agent 105.

AI engine 103 may utilize speech-to-text module 311. Speech-to-text module 311 may capture voice inputs and translate the voice inputs into text. AI engine 103 may apply a constructed persona to formulate text having linguistic and semantic characteristics expected to build rapport with caller 201 or human agent 105.

Figure 4:
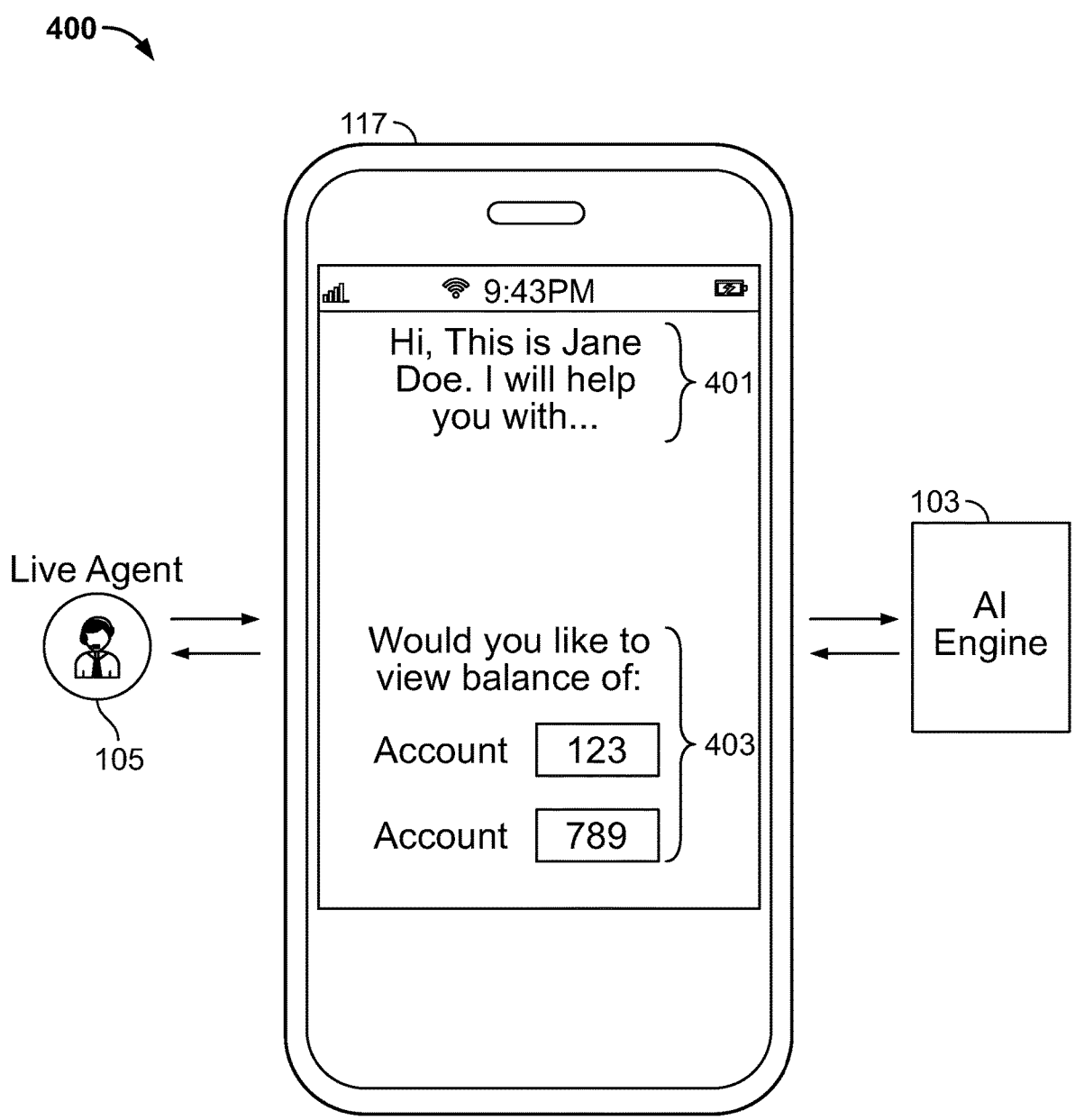
FIG. 4 shows an illustrative apparatus and scenario in accordance with principles of the disclosure.

FIG. 4 shows illustrative scenario 400. Scenario 400 shows a caller 201 (shown in FIG. 2) using device 117 (shown in FIG. 1) being provided, in parallel, responses generated by human agent 105 and AI engine 103. Scenario 400 shows that human agent 105 has provided response 401. Response 401 informs caller 201 that human agent 105 is available and ready to assist.

Scenario 400 also shows that AI engine 103 has provided machine generated response 403. Machine generated response 403 informs caller 201 that AI engine 103 may have located information desired by caller 201. Machine generated response 403 also informs caller 201 how to access the desired information using device 117. AI engine 103 may generate response 403 using a persona specially constructed for interacting with caller 201.

If machine generated response 403 does not provide the information desired by caller 201, caller 201 may interact with human agent 105. If machine generated response 403 does provide the desired information, caller 201 may not need to interact with human agent 105. By providing caller 201 predictive responses, AI engine 103 may shorten a duration, or bypass entirely, any interaction between human agent 105 and caller 201.

Figure 5:
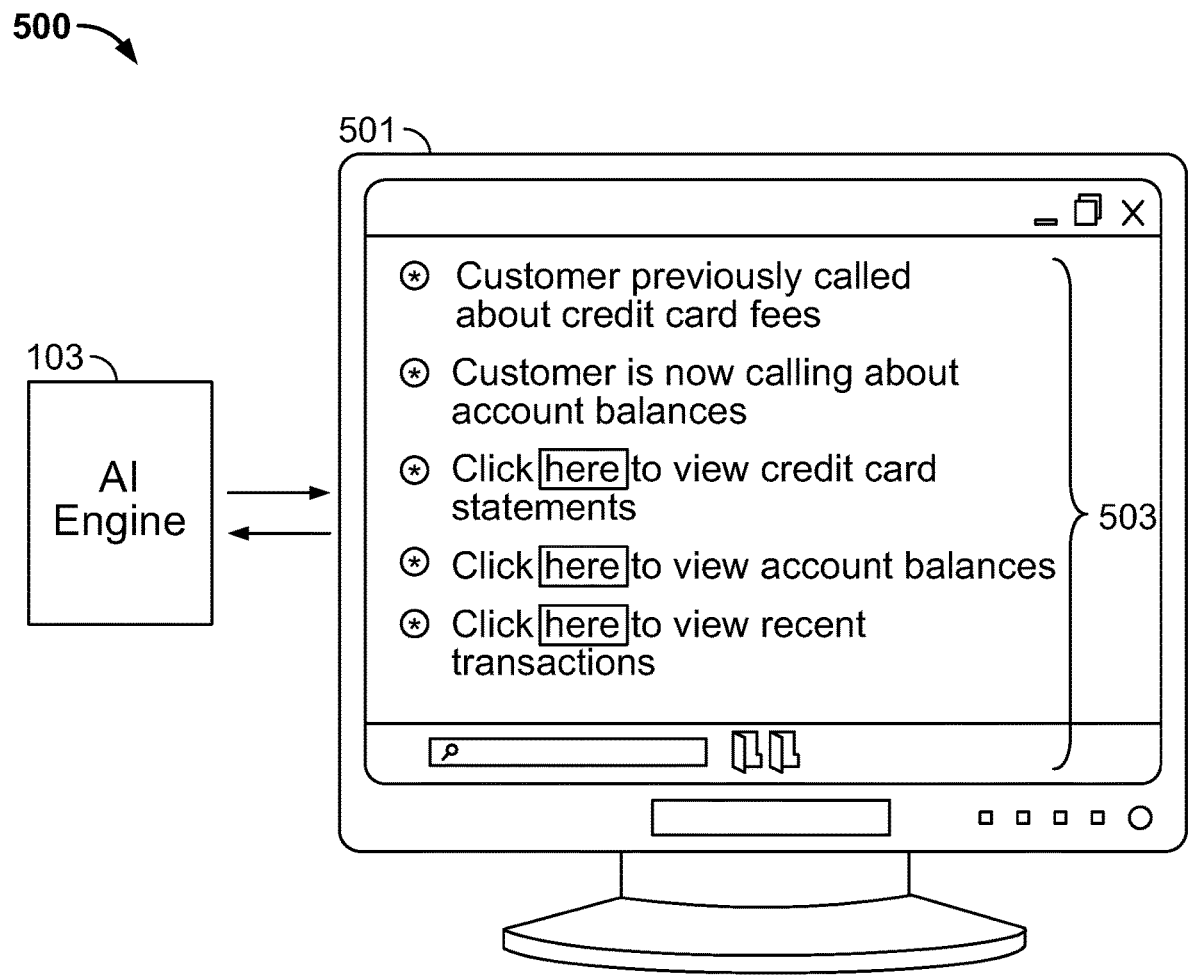
FIG. 5 shows an illustrative apparatus and scenario in accordance with principles of the disclosure.

FIG. 5 shows illustrative scenario 500. Scenario 500 shows AI engine 103 providing machine generated responses 503 to human agent 105 via terminal 501. AI engine 103 may generate responses 503 using a persona specially constructed for interacting with human agent 105. Responses 503 may provide templated response options for human agent 105. The templated response options may be formulated in accordance with prosody or semantic characteristics used by human agent 105 and may allow human agent 105 to quickly respond to caller 201. Human agent 105 may select one or more of templated responses 503 and transmit them to caller 201 (e.g., to device 117, shown in FIG. 1).

If machine generated responses 503 do not provide the information desired by human agent 105, human agent 105 may reject responses 105. Human agent 105 may select and edit one or more of responses 503. If machine generated responses 503 provide the desired information, human agent 105 may not need to formulate an original response for user 201.

By providing human agent 105 predictive responses 503, AI engine 103 may shorten a duration or bypass entirely any interaction between human agent 105 and caller 201. By providing human agent 105 predictive responses 503, AI engine 103 may allow human agent 105 to effectively manage a plurality of concurrent interactions with multiple callers.

Figure 6:
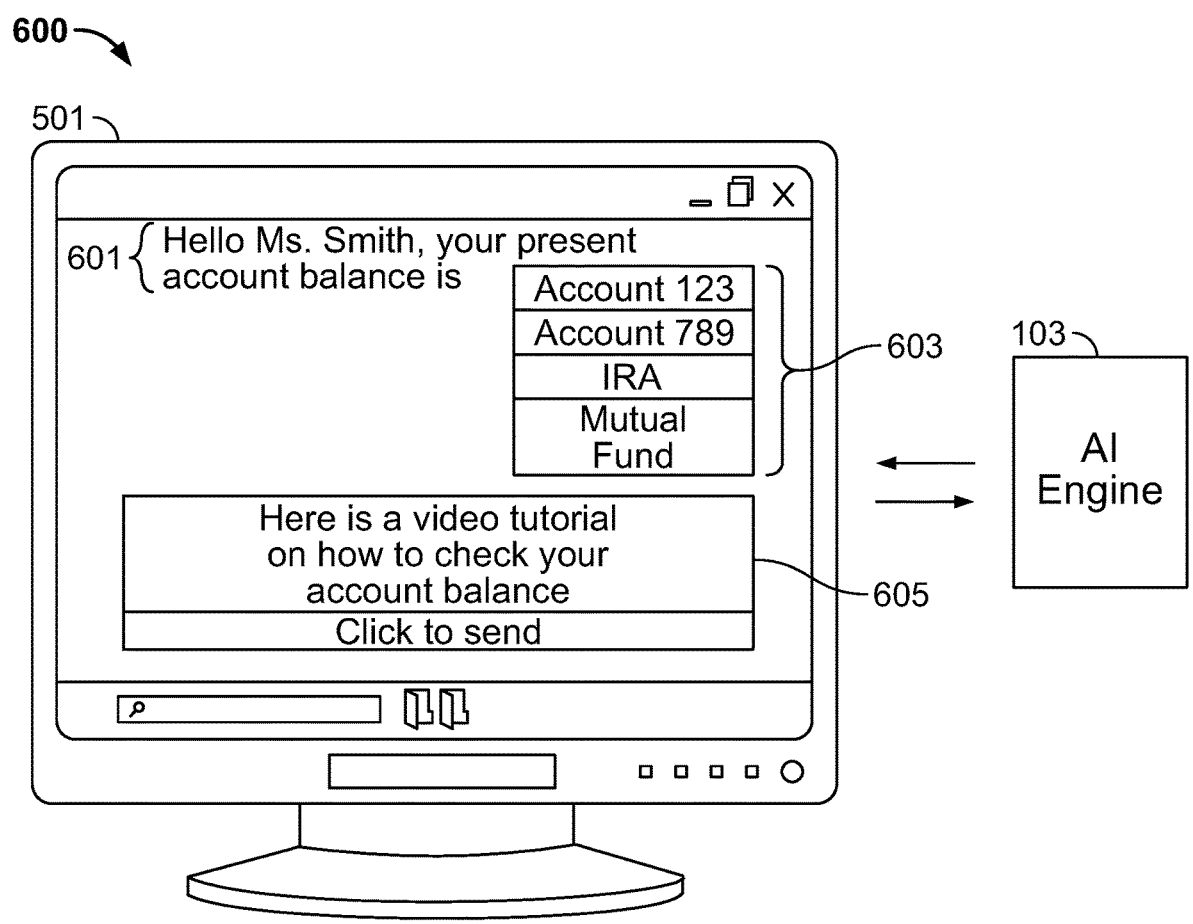
FIG. 6 shows an illustrative apparatus and scenario in accordance with principles of the disclosure.

FIG. 6 shows illustrative scenario 600. Scenario 600 shows AI engine 103 providing machine generated responses 603 and 605 to human agent 105 via terminal 501. AI engine 103 may generate responses 603 and 605 using a persona specially constructed for interacting with human agent 105. Human agent 103 may select one or more of the response options 603 or 605 and efficiently respond to caller 201.

Scenario 600 shows that human agent 105 has entered keyboard input 601 in response to caller 201. AI engine 103 may monitor keyboard inputs of human agent 105. AI engine 103 generates predictive text 603 that completes a message embodied in keyboard input 601. Using the persona specially constructed for interacting with human agent 105, AI engine 103 may generate predictive text 603 in accordance with prosody or semantic characteristics used by human agent 105. Such predictive text 603 may be more likely to be utilized by human agent 105 than text generated without using a persona specially constructed for interacting with human agent 105.

Scenario 600 also shows that AI engine 103 has generated alternative response 605. Alternative response 605 may provide additional information that may be helpful to caller 201. For example, AI engine 103 may determine that based on a response received from caller 201 in scenario 400, caller 201 is interested in checking the balance of their account. AI engine 103 may also determine that caller 201 has contacted telephony server 101 (shown in FIG. 1) multiple times regarding an account balance inquiry. AI engine 103 may suggest providing caller 201 with response 605 to enable caller 201 to view account balances without waiting for a response from system 100.

Human agent 105 may transmit response 605 to caller 201. Human agent 201 may advise caller 201 that response 605 will be provided by AI engine 103. Response 605 may provide caller 201 a tutorial video that is specially formatted for optimal viewing on device 117. For example, AI engine 103 may generate a tutorial video that is specially formatted based on live accounts of caller 201. For example, AI engine 103 may customize the tutorial video using data extracted from database 107 (shown in FIG. 1).

Figure 7:
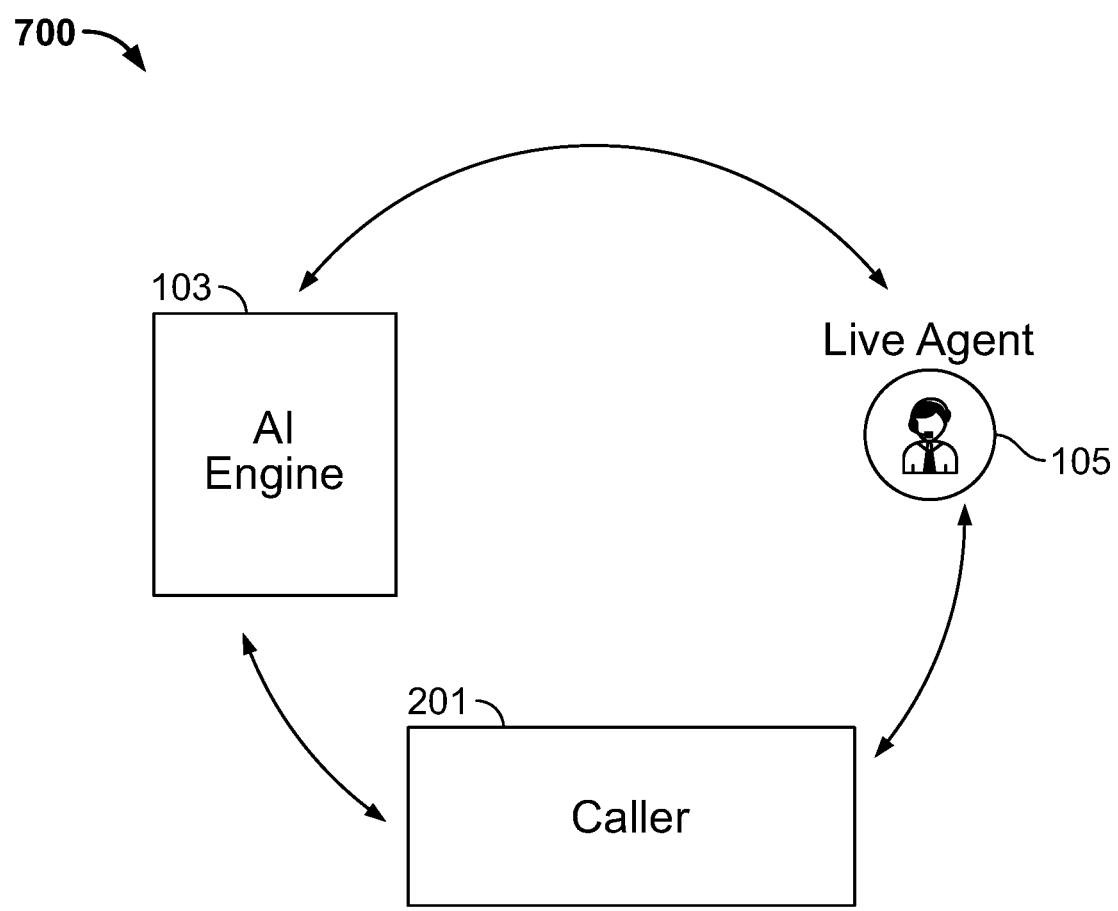
FIG. 7 shows an illustrative process in accordance with principles of the disclosure.

FIG. 7 shows illustrative process 700. Process 700 shows an illustrative cycle for recursively training AI engine 103. Process 700 shows that AI engine 103 monitors responses of human agent 105 provided to caller 201. AI engine 103 may be recursively trained by monitoring which responses are utilized by caller 201 and which responses are ignored or rejected by human agent 105.

Process 700 shows that AI engine 103 receives the responses formulated by human agent 105 and provided directly to caller 201. For example, based on responses formulated by human agent 105, AI engine 103 may determine whether human agent 103 agrees that caller 201 needed the assistance of human agent 105.

AI engine 103 may be recursively trained by monitoring which responses from human agent 105 are utilized by caller 201 and which responses are ignored or rejected by caller 201. AI engine 103 may also monitor predictive responses that are accepted or rejected by the human agent 105 when the AI engine 103 interacts with caller 201 in parallel with human agent 105.

Recursive training of AI engine 103 may reduce how often AI engine 103 transfers a caller to human agent 105. Recursive training of AI engine 103 may improve a relevance of machine generated responses generated by AI engine 103. Recursive training of AI engine 103 may improve how AI engine 103 interacts with human agent 103 in parallel with caller 201.

Figure 8:
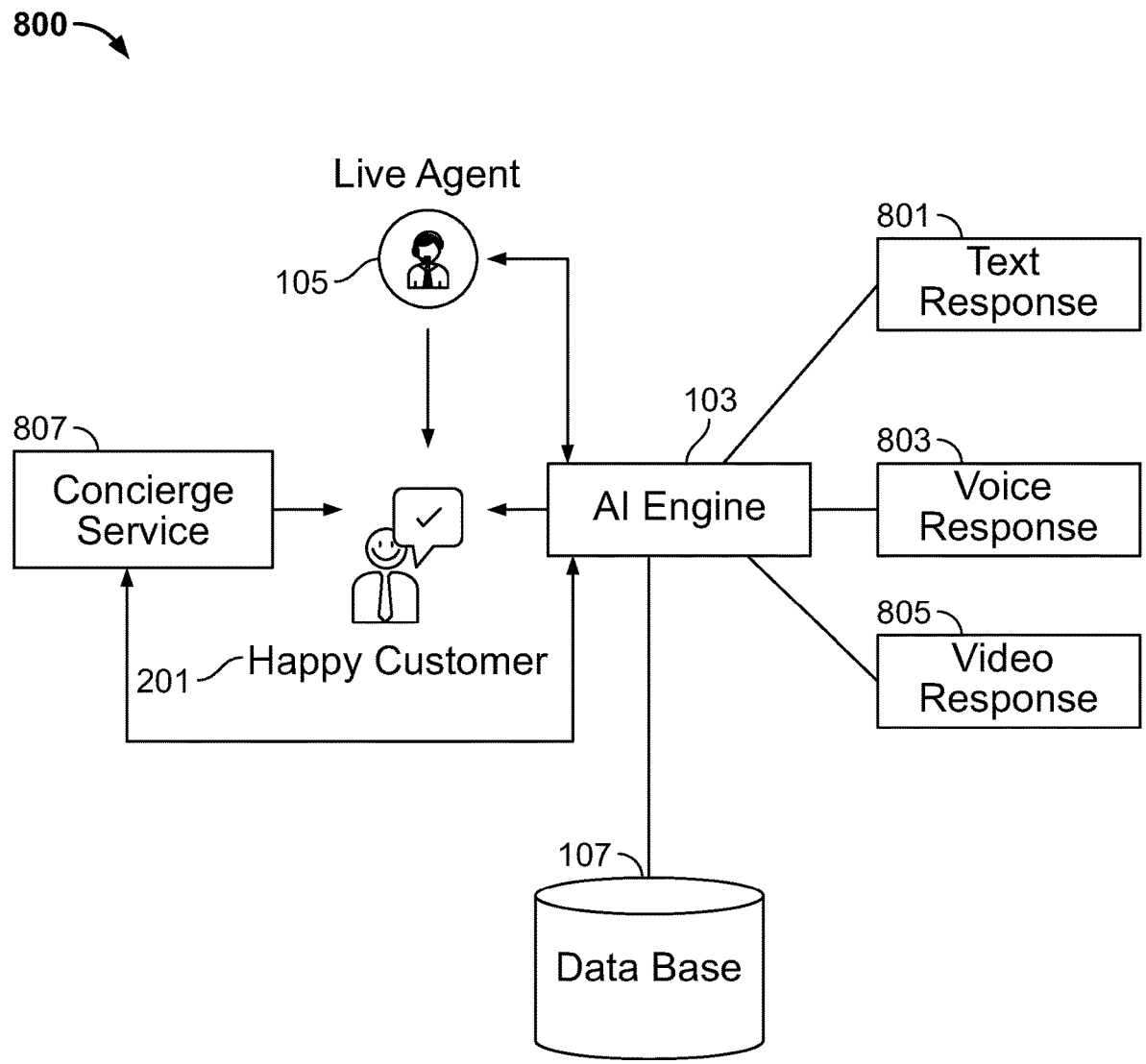
FIG. 8 shows an illustrative system in accordance with principles of the disclosure.

FIG. 8 shows illustrative system 800. System 800 includes AI engine 103. AI engine 103 has access to text communication channel 801, voice communication channel 803 and video communication channel 805. AI engine 103 is configured to construct a persona using a combination of the text, voice and video communications channels 801-805.

In some embodiments, AI engine may determine that caller 201 is associated with a special status within an organization. A caller with special status may be detected by AI engine 103 examining records stored in database 107. For such callers, AI engine may construct a persona that utilizes concierge service 807 to provide the caller "white glove" service. Upon detecting that caller 201 is associated with a special status, AI Engine 201 may connect caller 210 to concierge service 807.

Concierge service 807 may provide caller 201 with individualized attention, such as a dedicated human agent 105. When caller 201 interacts with system 100, a dedicated human agent 105 exclusively services caller 201 and will not service any other callers until a concern of caller 201 has been resolved.

AI engine 103 may provide machine generated responses to caller 201 by interacting with caller 201 using a persona that AI engine 103 determines is most likely to resolve, within a target interval, a concern of caller 201. AI engine 103 may provide machine generated responses to human agent 105 by interacting with human agent 105 using a persona that AI engine 103 determines is most likely to resolve, within a target interval, a concern of caller 201. AI engine 103 may provide machine generated responses to human agent 105 by interacting with human agent 105 using a persona that AI engine 103 determines is most likely to provide responses that will be utilized by human agent 105.

AI engine 103 is configured to construct a persona using a combination of text, voice and video communications channels 801-805. AI engine 103 may construct the persona in a fashion that is expected establish rapport with caller 201 or human agent 105. AI engine 103 may determine that human agent 105 or caller 201 is likely to accept machine generated responses provided by AI engine 103 when using the constructed persona.

AI engine 103 may construct the persona by selecting a voice, accent or language for communicating with caller 201 or human agent 105. For example, AI engine 103 may attempt to construct a persona that builds rapport by communicating with caller 201 using a foreign language. AI engine 103 may construct a persona that uses an accent associated with a locale of caller 201 or human agent 105.

Thus, methods and apparatus for CALL INTERCEPTION HEURISTICS are provided. Persons skilled in the art will appreciate that the present invention can be practiced by other than the described embodiments, which are presented for purposes of illustration rather than of limitation, and that the present invention is limited only by the claims that follow.

What is claimed is:

1. An interactive voice response ("IVR") system comprising:
   a telephony server that, in operation:
      receives voice inputs submitted by a caller using a communication network;
      provides an interface for the caller to interact with an artificial intelligence ("AI") engine over the communication network; and
      transmits to the caller, over the communication network, responses to the voice inputs generated by the AI engine;
   a database:
      storing transaction information associated with the caller; and
      running an application program interface that is compatible with the AI engine and provides the AI engine access to the transaction information; and
   an application server running the AI engine that, in operation:
      receives, from the telephony server, the voice inputs generated by the caller;
      accesses the database storing transaction information generated by the caller;
      constructs a profile of the caller based on:
         the transaction information;
         a machine learning model;
         prosody and semantic analysis of the voice inputs; and
         prior interactions of the AI engine with the caller; and
      generates, using machine learning, a machine response to the voice inputs by interacting with the caller defined by the profile using a persona that the AI engine determines is most likely to resolve, within a target interval, a concern of the caller defined by the profile.

2. The system of claim 1, the application server further comprising:
   a text communication channel;
   a voice communication channel; and
   a video communication channel;
   wherein, the AI engine is configured to construct the persona using a combination of the text, voice and video communications channels.

3. The system of claim 1, wherein, the voice inputs are a first set of voice inputs, the AI engine in operation, adjusts the persona in response to analysis of a second set of voice inputs received from the caller.

4. The system of claim 1, wherein, the AI engine constructs the persona before conducting any interaction with the caller.

5. The system of claim 4, wherein the voice inputs are a first set of voice inputs and, before conducting any interaction with the caller, the AI engine:
   links a terminal accessible by a human agent to the application server;
   after linking the terminal to the application server, receives:
      from the terminal, a problem set; and
      from the telephony server, a second set of voice inputs generated by the caller; and
   applies the persona to generate a machine interpretation of the second set of voice inputs responsive to the problem set.

6. The system of claim 1, wherein the voice inputs are a first set of voice inputs, the persona a first persona and the AI engine, in operation:
   links a terminal accessible by a human agent to the application server; and
   after linking the terminal to the application server, generates a machine response to a second set of voice inputs by interacting with the terminal using a second persona that the AI engine determines will mimic a response to the second inputs formulated by the human agent.

7. An interactive voice response ("IVR") system comprising:
   a telephony server that, in operation:
      receives voice inputs submitted by a caller using a communication network;
      provides an interface for the caller to interact with an artificial intelligence ("AI") engine over the communication network;
      transmits to the caller, over the communication network, responses to the voice inputs generated by the AI engine; and
   an application server hosting the AI engine that, in operation:
      receives, from the telephony server, a first set of inputs generated by the caller;
      based on the first set of inputs and a machine learning model, generates a machine generated persona for interacting with the caller;
      using the persona, classifies the first set of inputs as requiring intervention by a human agent;
      using the persona, links a terminal accessible by the human agent to the application server;
      generates a machine generated persona for interacting with the human agent;
      receives, from the telephony server, a second set of voice inputs generated by the caller;
      generates a first set machine responses to the second set of voice inputs using the first persona and a machine learning model;
      generates a second set machine responses to the second set of voice inputs using the second persona and a machine learning model; and
      in parallel, provides the first set of machine responses to the caller and provides the second set of machine responses to the human agent;

wherein, providing the first and second sets of machine responses in parallel reduces a duration of the interaction relative to the duration when the responses are not provided in parallel.

8. The IVR system of claim 7, wherein:
the first persona applies a first combination of communication channels when interacting with the caller; and
the second persona applies a second combination of communication channels when interacting with the human agent.

9. The IVR system of claim 7, wherein the AI engine generates the second persona based on a number of callers concurrently linked to the terminal.

10. The IVR system of claim 7, wherein the AI engine is configured to adjust the first and second persona based on a duration of time the caller is connected to the telephony server.

11. A method for leveraging artificial intelligence to integrate human and machine responses within an interactive voice response ("IVR") system, the method comprising:
initiating an interaction with a caller and an artificial intelligence ("AI") engine;
providing, to the AI engine, voice inputs generated by the caller;
receiving, from the AI engine, a predictive recommendation to transfer the caller to a human agent;
initiating a hand-off procedure and transferring the caller to the human agent;
after transferring the caller to the human agent, continuing to provide the voice inputs generated by the caller to the AI engine;
after transferring the caller to the human agent, determining when to intercept the human agent and provide predictive responses to the voice inputs;
wherein the AI engine determines when to intercept the human agent based on extracting prosody information from the voice inputs; and
wherein the prosody information comprises changes in one or more of:
pitch, loudness, timbre, speech rate, and pauses; and
recursively improving interception timing of the AI engine by providing to the AI engine:
intercepted responses accepted by the human agent; and
responses of the human agent when the intercepted responses are rejected by the human agent;

wherein recursively improving the interception timing reduces how often the AI engine generates the predictive recommendation to transfer the caller to the human agent relative to how often the AI engine generates the predictive recommendation without recursively improving the interception timing.

12. The method of claim 11 wherein the AI engine determines when to intercept the human agent based on extracting semantic information from the voice inputs.

13. The method of claim 11 wherein the AI engine determines when to intercept the human agent based on extracting prosody information from responses provided by the human agent to the caller.

14. The method of claim 11 wherein the AI engine determines when to intercept the human agent based on extracting semantic information from responses provided by the human agent to the caller.

15. The method of claim 11 further comprising, using the AI engine:
monitoring a plurality of concurrent interactions managed by the human agent; and
determining when to intercept the human agent based on collective prosody and semantic information generated by the human agent across the plurality of concurrent interactions.

16. The method of claim 11 further comprising, using the AI engine:
monitoring a plurality of concurrent interactions initiated by a plurality of callers, wherein the plurality of concurrent interactions is managed by the human agent; and
determining when to intercept the human agent based on the collective prosody and semantic information generated by the plurality of callers across the plurality of concurrent interactions.

17. The method of claim 11, wherein the AI engine:
accesses a database storing transaction information generated by the caller;
constructing a profile of the caller based on the transaction information; and
determining when to intercept the human agent based on the profile.

18. The method of claim 11, wherein, the intercepting comprises initiating a video chat between the human agent and the caller.

* * * * *